(12) United States Patent
Mizuno et al.

(10) Patent No.: US 11,183,319 B2
(45) Date of Patent: Nov. 23, 2021

(54) WIRE HARNESS AND METHOD OF MANUFACTURING WIRE HARNESS

(71) Applicants: AutoNetworks Technologies, Ltd., Mie (JP); Sumitomo Wiring Systems, Ltd., Mie (JP); Sumitomo Electric Industries, Ltd., Osaka (JP)

(72) Inventors: Housei Mizuno, Mie (JP); Daichi Fukushima, Mie (JP); Miyu Aramaki, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(*) Notice: Subject to any disclaimer, the term of this patent is extended or adjusted under 35 U.S.C. 154(b) by 0 days.

(21) Appl. No.: 16/981,789

(22) PCT Filed: Mar. 7, 2019

(86) PCT No.: PCT/JP2019/009000
§ 371 (c)(1),
(2) Date: Sep. 17, 2020

(87) PCT Pub. No.: WO2019/188080
PCT Pub. Date: Oct. 3, 2019

(65) Prior Publication Data
US 2021/0134490 A1    May 6, 2021

(30) Foreign Application Priority Data
Mar. 28, 2018  (JP) .............................. JP2018-061265

(51) Int. Cl.
*H01B 13/00* (2006.01)
*B60R 16/02* (2006.01)
*H01B 7/00* (2006.01)
*H01B 13/012* (2006.01)

(52) U.S. Cl.
CPC ..... *H01B 13/0013* (2013.01); *B60R 16/0207* (2013.01); *H01B 7/0045* (2013.01); *H01B 13/01209* (2013.01)

(58) Field of Classification Search
CPC .......... B60R 16/0207; H01B 13/01209; H01B 7/0045; H01B 13/0013; H01B 7/40;
(Continued)

(56) References Cited

U.S. PATENT DOCUMENTS

| 2002/0096358 A1* | 7/2002 | Murakami ......... H01B 11/1091 174/251 |
| 2002/0170729 A1 | 11/2002 | Murakami et al. |
| 2014/0048329 A1 | 2/2014 | Yamamoto et al. |

FOREIGN PATENT DOCUMENTS

| CN | 101151684 | 3/2008 |
| CN | 102396039 | 3/2012 |

(Continued)

OTHER PUBLICATIONS

International Search Report issued in International Patent Application No. PCT/JP2019/009000, dated Apr. 23, 2019, together with an English translation thereof.

(Continued)

*Primary Examiner* — Timothy J Thompson
*Assistant Examiner* — Michael F McAllister
(74) *Attorney, Agent, or Firm* — Greenblum & Bernstein, P.L.C.

(57) ABSTRACT

A wire harness includes: an electrical wire including a core wire and an insulating covering for covering the core wire; and a sheet material in which the electrical wire is disposed on a resin main surface, and a part of the main surface having contact with the electrical wire is welded to the insulating covering of the electrical wire, thereby forming an electrical wire fixing part. A largest thickness dimension in the electrical wire fixing part in the sheet material is formed larger than a thickness dimension in a part of the sheet material where the electrical wire is not disposed.

4 Claims, 5 Drawing Sheets

(58) Field of Classification Search
CPC ........ H01B 13/012; H01B 3/448; H02G 3/04;
H02G 15/02; H02G 1/14; H01R 4/02;
H01R 4/70; H01R 4/18; H01R 4/183
USPC ...................................................... 174/72 A
See application file for complete search history.

(56) References Cited

FOREIGN PATENT DOCUMENTS

| | | |
|---|---|---|
| EP | 1630826 | 3/2006 |
| JP | 50-54597 | 5/1975 |
| JP | 2001-505706 | 4/2001 |
| JP | 2002-80819 | 3/2002 |
| JP | 2002-216871 | 8/2002 |
| JP | 2002-343156 | 11/2002 |
| JP | 2015-72798 | 4/2015 |
| WO | 98/18138 | 4/1998 |
| WO | 2004/107356 | 12/2004 |

OTHER PUBLICATIONS

International Preliminary Report on Patentability (IPRP) issued in International Patent Application No. PCT/JP2019/009000, dated Oct. 16, 2019, together with an English translation thereof.
Indian Official Action issued in Indian Patent Application No. 202017040096, dated Feb. 5, 2021.
China Office Action issued in China Patent Application No. 201980021077.8, dated Jul. 7, 2021, together with English translation thereof.

\* cited by examiner

WIRE HARNESS AND METHOD OF MANUFACTURING WIRE HARNESS

TECHNICAL FIELD

The present invention relates to a technique of attaching electrical wires to an exterior member in a wire harness for vehicle.

BACKGROUND ART

Patent Document 1 discloses a technique, when a sheet-like exterior member is attached to electrical wires, for positioning the exterior member with respect to the electrical wires by winding a tape around each end portion of the exterior member and the electrical wires extending from the end portion.

PRIOR ART DOCUMENTS

Patent Documents

Patent Document 1: Japanese Patent Application Laid-Open No. 2015-72798

SUMMARY

Problem to be Solved by the Invention

Herein, the applicant of the present application proposes, as a new method of fixing the electrical wires and the sheet-like exterior member, a method of directly fixing an insulating covering of the electrical wires and a sheet material by a welding means such as ultrasonic welding.

In the case where the insulating covering of the electrical wires and the sheet material are welded, if the sheet material is too thin, necessary peeling strength can be hardly obtained, thus some degree of thickness is necessary in a welding part in the sheet material. In the meanwhile, in a part of the sheet material which is not welded to the insulating covering of the electrical wire, the thickness described above is unnecessary, and increase in the thickness leads to increase in quantity.

Thus, an object of the present invention is to provide a technique capable of suppressing increase in quantity in a wire harness in which an insulating covering of an electrical wire and a sheet material are welded.

Means to Solve the Problem

In order to solve the above problems, a wire harness according to a first aspect includes: an electrical wire including a core wire and an insulating covering for covering the core wire; and a resin sheet material in which the electrical wire is disposed on a main surface, and a part of the main surface having contact with the electrical wire is welded to the insulating covering of the electrical wire, thereby forming an electrical wire fixing part, wherein a largest thickness dimension in the electrical wire fixing part in the sheet material is formed larger than a thickness dimension in a part of the sheet material where the electrical wire is not disposed and the core wire and the sheet material are insulated in the electrical wire fixing part.

A wire harness according to a second aspect is the wire harness includes: an electrical wire including a core wire and an insulating covering for covering the core wire; and a resin sheet material in which the electrical wire is disposed on a main surface, and a part of the main surface having contact with the electrical wire is welded to the insulating covering of the electrical wire, thereby forming an electrical wire fixing part, wherein a largest thickness dimension in the electrical wire fixing part in the sheet material is formed larger than a thickness dimension in a part of the sheet material where the electrical wire is not disposed and a lateral portion of the electrical wire is concave in the main surface of the sheet material.

A wire harness according to a third aspect is the wire harness according to the first or second aspect, wherein an inclined surface is formed in the lateral portion of the electrical wire in the main surface of the sheet material so that a height along a thickness direction decreases with increase in distance from the electrical wire.

A method of manufacturing a wire harness according to a fourth embodiment includes steps of: (a) locating an electrical wire including a core wire and an insulating covering for covering the core wire on a resin electrical wire disposed part in a sheet material, and sandwiching the electrical wire and the electrical wire disposed part by a sandwiching member; and (b) after the step of (a), bringing a part of the sheet material where the electrical wire is not disposed close to the electrical wire disposed part, and welding the insulating covering and the electrical wire disposed part so that the core wire and the sheet material are insulated.

Effects of the Invention

According to each aspect, a thickness necessary for the electrical wire fixing part can be obtained while using the sheet material having a small thickness in whole, thus increase in quantity of the wire harness can be suppressed.

According to the second aspect, the part of the sheet material concaved in the lateral portion of the electrical wire is brought close to the electrical wire fixing part, thus a volume of the electrical wire fixing part can be significantly increased.

According to the third aspect, the lateral portion of the electrical wire in the sheet material can be easily brought close to the electrical wire fixing part.

According to the fourth aspect, the thickness of the electrical wire fixing part after welding can be made larger than that of the area around the electrical wire fixing part even when a sheet material having a uniform thickness before welding is used.

DESCRIPTION OF EMBODIMENT(S)

Embodiment

Figure 1:
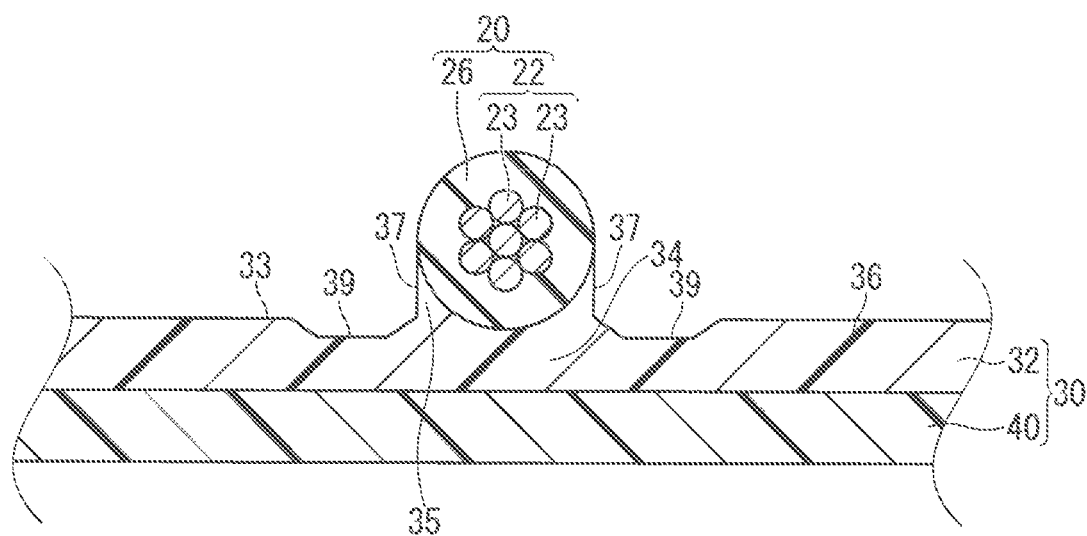
FIG. 1 A cross-sectional view illustrating a wire harness according to an embodiment.

A wire harness according to an embodiment is described hereinafter. FIG. 1 is a cross-sectional view illustrating a wire harness 10 according to the embodiment.

The wire harness 10 is used as a wiring member mounted to a vehicle to electrically connect various apparatuses, for example. The wire harness 10 includes an electrical wire 20 and a sheet material 30. In an example illustrated in FIG. 1, one electrical wire 20 is disposed on one sheet material 30, and there may also be obviously a case where a plurality of electrical wires 20 are disposed on one sheet material 30.

The electrical wire 20 is connected to various apparatuses mounted to a vehicle via a terminal or a connector connected to an end portion of the electrical wire 20, for example. The electrical wire 20 includes a core wire 22 and an insulating covering 26 for covering the core wire 22. Herein, an outer peripheral surface of the insulating covering 26 is formed into a shape of a circumferential surface. Accordingly, a so-called round wire is adopted as the electrical wire 20.

The core wire 22 is made up of one or a plurality of strands 23 (seven in the example illustrated in FIG. 1). Each strand 23 is a linear member formed of a conductive material such as copper, copper alloy, aluminum, and aluminum alloy, for example. When the core wire 22 is made up of the plurality of strands 23, the core wire 22 is preferably a stranded wire made up of the plurality of strands 23.

The insulating covering 26 is formed by extrusion molding of a resin material having insulation properties such as polyvinyl chloride (PVC) or polyethylene (PE) around the core wire 22 or applying a resin coating of enamel, for example, around the core wire 22. Herein, the insulating covering 26 includes a thermoplastic resin. Particularly, in the description herein, the insulating covering 26 is formed of a resin material including PVC.

More specifically, the insulating covering 26 is formed of a material with PVC as a base to which a plasticizer is added. The plasticizer is an additive agent for softening a PVC product, and in the PVC product a product having a high ratio of the plasticizer to PVC is generally softer than a product having a low ratio of the plasticizer. A type of the plasticizer is not particularly limited, but applicable is a plasticizer such as phthalic ester, trimellitic acid ester, pyromellitic acid ester, fatty acid ester, and fatty acid polyester, for example. One type of the plasticizer may be solely used, or plural types of the plasticizers may also be used together. It is also considered that various types of additive agents such as a stabilizer other than the plasticizer is added to PVC constituting the insulating covering 26.

At least part of the insulating covering 26 disposed on the sheet material 30 is welded to the sheet material 30, thus the electrical wire 20 is fixed to the sheet material 30.

At this time, a route of the electrical wire 20 disposed on the sheet material 30 is not particularly limited. For example, the electrical wire 20 may extend linearly on the sheet material 30 or may also be curved. When the plurality of electrical wires 20 are disposed on one sheet material 30, there may be a case where the plurality of electrical wires 20 all extend in the same direction or partially extend in a different direction. There may also be a case where a branch part where the plurality of electrical wires 20 branch off is formed on the sheet material 30.

It is not particularly limited which region is welded in the electrical wire 20 disposed on the sheet material 30 along a longitudinal direction. For example, the insulating covering 26 and the sheet material 30 may be sequentially welded along the longitudinal direction of the electrical wire 20, or a partial welding (spot welding) may be performed on a plurality of positions along the longitudinal direction of the electrical wire 20. In the former case, a whole region in the electrical wire 20 disposed on the sheet material 30 may be welded or there may be partially an area not welded. In the latter case, a pitch between the spot welding positions may be or may not be constant.

The sheet material 30 includes an electrical wire fixing layer 32 made of resin. The electrical wire 20 is disposed on a main surface 33 of the electrical wire fixing layer 32 made of resin. A part of the main surface 33 having contact with the electrical wire 20 is welded to the insulating covering 26 of the electrical wire 20, thereby forming an electrical wire fixing part 34. The part of the electrical wire fixing layer 32 other than the electrical wire fixing layer 34, that is to say, the part where the electrical wire 20 is not disposed on the main surface 33 is referred to as an electrical wire undisposed part 36. A part of the sheet material 30 including the electrical wire fixing part 34 (the electrical wire fixing layer 32 herein) is softer than the insulating covering 26. Rockwell hardness, for example, can be used as an index of such softness.

A material constituting a part of the sheet material 30 including the electrical wire fixing part 34 is not particularly limited as long as it can be welded to the insulating covering 26. However, the part of the sheet material 30 including the electrical wire fixing part 34 preferably include the same resin as the insulating covering 26. Accordingly, adhesion strength between the electrical wire fixing part 34 and the insulating covering 26 by welding can be increased. In the description herein, the insulating covering 26 includes PVC, thus the part of the sheet material 30 including the electrical wire fixing part 34 is also formed of a material including PVC.

More specifically, the part, of the sheet material 30 including the electrical wire fixing part 34 is formed of a material with PVC as a base to winch a plasticizer is added. A type of the plasticizer is not particularly limited, but applicable is a plasticizer such as phthalic ester, trimellitic acid ester, pyromellitic acid ester, fatty acid ester, and fatty acid polyester, for example. One type of the plasticizer may be solely used, or plural types of the plasticizers may also be used together. In the description hereinafter, a plasticizer added to PVC constituting the part including the electrical wire fixing part 34 is the same as a plasticizer added to PVC which is a material of the insulating covering 26. At this time, a ratio of the plasticizer to PVC constituting the part including the electrical wire fixing part 14 is higher than a ratio of the plasticizer to PVC constituting the insulating covering 26, thus the part including the electrical wire fixing part 34 is softer than the insulating covering 26.

It is also considered that the plasticizer added to PVC constituting the part including the electrical wire fixing part 34 is different from the plasticizer added to PVC constituting the insulating covering 26. It is also considered that various types of additive agents such as a stabilizer other than the plasticizer is added to PVC constituting the part including the electrical wire fixing part 34.

Herein, the sheet material 30 includes a first layer 32 as the electrical wire fixing layer 32 described above and a second layer 40 stacked on the first layer 320. The first layer 32 is uniformly formed of the same material as that constituting the part including the electrical wire fixing part 34. Accordingly, the first layer 32 is formed of a material with PVC as a base to which a plasticizer, which is the same as that added to the insulating covering 26, is added. A ratio of the plasticizer to PVC constituting the first layer 32 is higher than a ratio of the plasticizer to PVC constituting the insulating covering 26, thus the first layer 32 is softer than the insulating covering 26.

The second layer 40 has physical properties different from the first layer 32. More specifically, the first layer 32 is a part having physical properties more appropriate for welding to the insulating covering 26 than the second layer 40, and the second layer 40 is a part having physical properties needed depending on usage of the sheet material 30, for example.

For example, the second layer 40 is considered to be formed harder than the first layer 32 for a purpose of improving shape retainability. Accordingly, handleability of the wire harness 10 at a time of assembling the wire harness 10 to a vehicle can be improved compared with a case where a sheet material is made up only of the soft first layer 32. The second layer 40 is also considered to be formed harder than the first layer 32 for a purpose of improving abrasion resistance properties, for example.

At this time, the second layer 40 is considered to be formed harder than the first layer 32 by a material including the same resin as the first layer 32 as a base. Herein, the first layer 32 includes PVC as the base, thus the second layer 40 is considered to include PVC as the base. In this case, a ratio of the plasticizer to PVC constituting the second layer 40 is made lower than a ratio of the plasticizer to PVC constituting the first layer 32, thus the second layer 40 can be harder than the first layer 32.

The second layer 40 is also considered to be formed harder than the first layer 32 by a material including a resin different from the first layer 32 as a base. Herein, the first layer 32 includes PVC as a base, thus the second layer 40 is considered to be formed of a material including a resin other than PVC such as PE, polyethylene (PE), polyethylene terephthalate (PET), for example, as a base.

A method of forming the sheet material 30 having the first layer 32 and the second layer 40 is not particularly limited, however, it is considered that the sheet material 30 is formed by a coextrusion method of achieving a laminated structure with a single extrusion process or a laminating method of separately forming the first layer 32 and the second layer 40 into a sheet-like shape and then mutually attaching them.

When the electrical wire fixing part 34 is viewed, the sheet material 30 and the insulating covering 26 are welded while the main surface 33 of the sheet material 30 is curved to follow an outer periphery of the electrical wire 20. From the other viewpoint, a boundary surface of the welding between the insulating covering 26 and the electrical wire fixing part 34 is formed into a shape closer to the circumferential surface of the insulating covering 26 than the shape of the main surface 33 in the electrical wire un-disposed part 36. This is caused by a condition where a deformation amount of the sheet material 10 is larger than that of the insulating covering 26.

At this time, the sheet material 30 is preferably welded to the insulating covering 26 within a range at an angle of 15 degrees or more around the insulating covering 26. In other words, an angle T between a segment connecting a center of the core wire 22 and one end edge portion of a welded region around the insulating covering 26 and a segment connecting the center of the core wire 22 and the other end edge portion of the welded region around the insulating covering 26 (referred to FIG. 2) is preferably equal to or larger than 15 degrees. The angle T equal to or larger than 30 degrees is preferable to that smaller than 30 degrees. The angle T equal to or larger than 45 degrees is preferable to that smaller than 45 degrees. Furthermore, the angle T equal to or larger than 90 degrees is preferable to that smaller than 90 degrees. Herein, the sheet material 30 is welded to the insulating covering 26 within a range at an angle of approximately 180 degrees around the insulating covering 26.

When an area around the electrical wire fixing part 34 is viewed, an outer side surface of the electrical wire fixing part constitutes a vertical surface 37. A lateral portion of the electrical wire 20 is concave in the main surface 33 described above in the first layer 32 of the sheet material 30, This concave portion is referred to as a concave portion 39 hereinafter. Although details are described hereinafter, the vertical surface 37 and the concave portion 39 are formed by pressing the sheet material 30 by a sandwiching member at a time of welding the insulating covering 26 and the sheet material 30.

Figure 2:
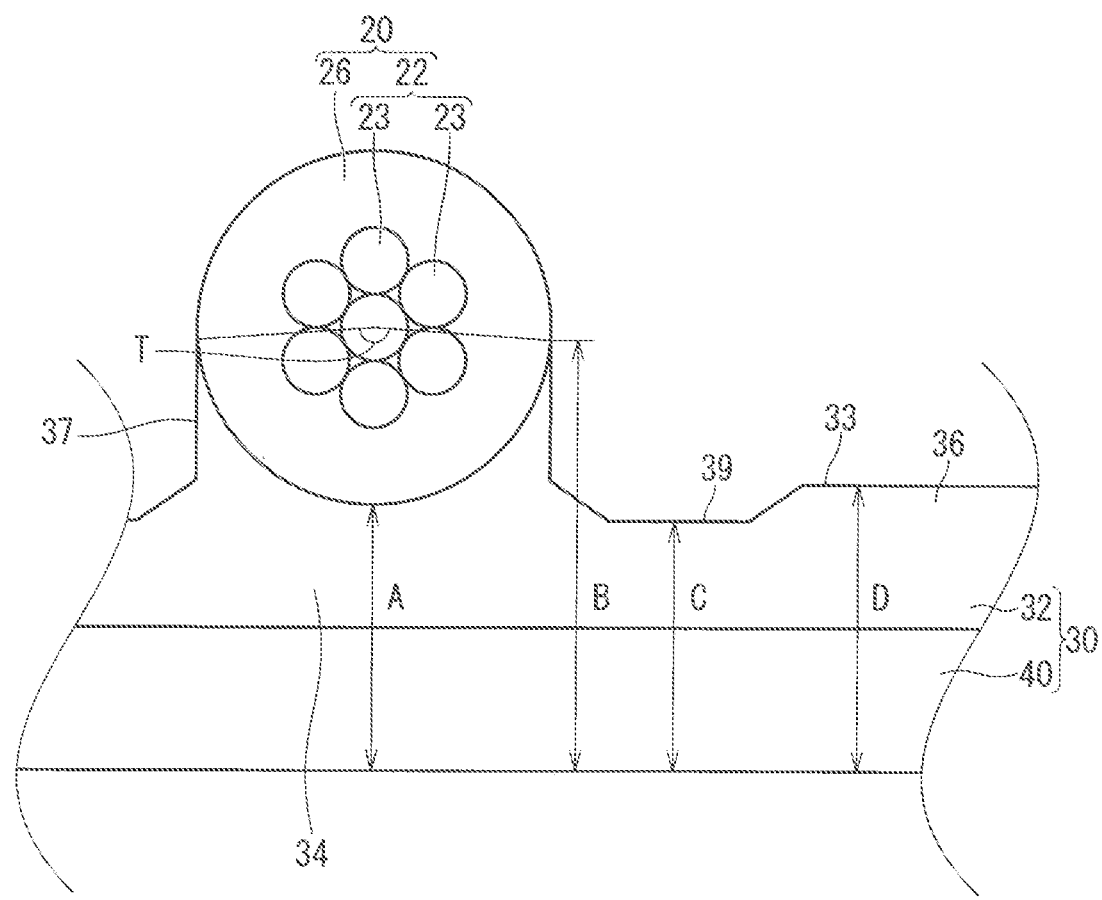
FIG. 2 A drawing for explaining a thickness dimension of a sheet material.

Next, a thickness dimension of each part of the sheet material 30 in the wire harness 10 is described with reference to FIG. 2. FIG. 2 is a drawing for explaining the thickness dimension of the sheet material 30. A hatching of a cross section is omitted in FIG. 2.

A dimension A in FIG. 2 is the smallest thickness dimension in the electrical wire fixing part 34 of the sheet material 30. The dimension A is the thickness dimension in a direction through a center of the electrical wire 20 along a normal direction of the main surface 33 of the sheet material 30, for example. A position of the dimension A is located in a part where the electrical wire 20 and the sheet material 30 have first contact with each other at the time of welding, for example.

A dimension B in FIG. 2 is the largest thickness dimension in the electrical wire fixing part 34 of the sheet material 30. The dimension B is the thickness dimension in a position furthest away from the position of the dimension A, for example. The position of the dimension B is located in a part to be a gap formed when the electrical wire 20 is disposed on the sheet material 30, for example.

A dimension C in FIG. 2 is a thickness dimension in the concave portion 39 formed in a position immediately lateral to the electrical wire 20. The dimension C is considered the smallest thickness dimension in the part including the electrical wire un-disposed part 36 in the sheet material 30.

A dimension D in FIG. 2 is a thickness dimension in a position on a side opposite to the electrical wire 20 in relation to the concave portion 39. The dimension D is considered a dimension of a part including the electrical wire tin-disposed part 36 having the largest thickness. The dimension D is considered to be the same as the thickness dimension of the sheet material 30 before welding.

As illustrated in FIG. 2, herein, the thickness dimension B having the largest thickness in the electrical wire fixing part 34 in the sheet material 30 is formed larger than each of the thickness dimensions C and D in the part of the sheet material 30 including the electrical wire un-disposed part 36.

Herein, it is considered that the thickness is made different between an electrical wire disposed part and an electrical wire un-disposed part in the sheet member before welding, for example, to make the dimension B larger than each of the dimensions C and D. However, in this case, there is a possibility that a manufacturing cost of the sheet material increases and general versatility decreases. Thus, herein, the dimension B is set larger than each of the dimensions C and D using a sheet material having an electrical wire fixing layer with a uniform thickness as a sheet material before welding. Herein, the concave portion 39 is formed, thus the dimension B is set larger than each of the dimensions C and D even when a sheet material having an electrical wire fixing layer with a uniform thickness is used as a sheet material before welding.

Furthermore, herein, when a thickness of the electrical wire fixing layer in the sheet material before welding is small, there is a possibility that the sheet material 30 is hardly welded to a large area around the insulating covering 26. Even in this case, the concave portion 39 is provided herein, thus the sheet material 30 can be welded to a large area around the insulating covering 26.

As illustrated in FIG. 2, herein, the thickness dimension A which is the smallest in the electrical wire fixing part 34 in the sheet material 30 is formed larger than the thickness dimension C in the part where the concave portion 39 is formed in the sheet material 30. This is caused by a condition where the concave portion 39 is provided in the sheet material 30, thus a part of the sheet material 30 where the concave portion 39 is provided is brought close to the electrical wire fixing part 34.

<Manufacturing Method>

Figure 3:
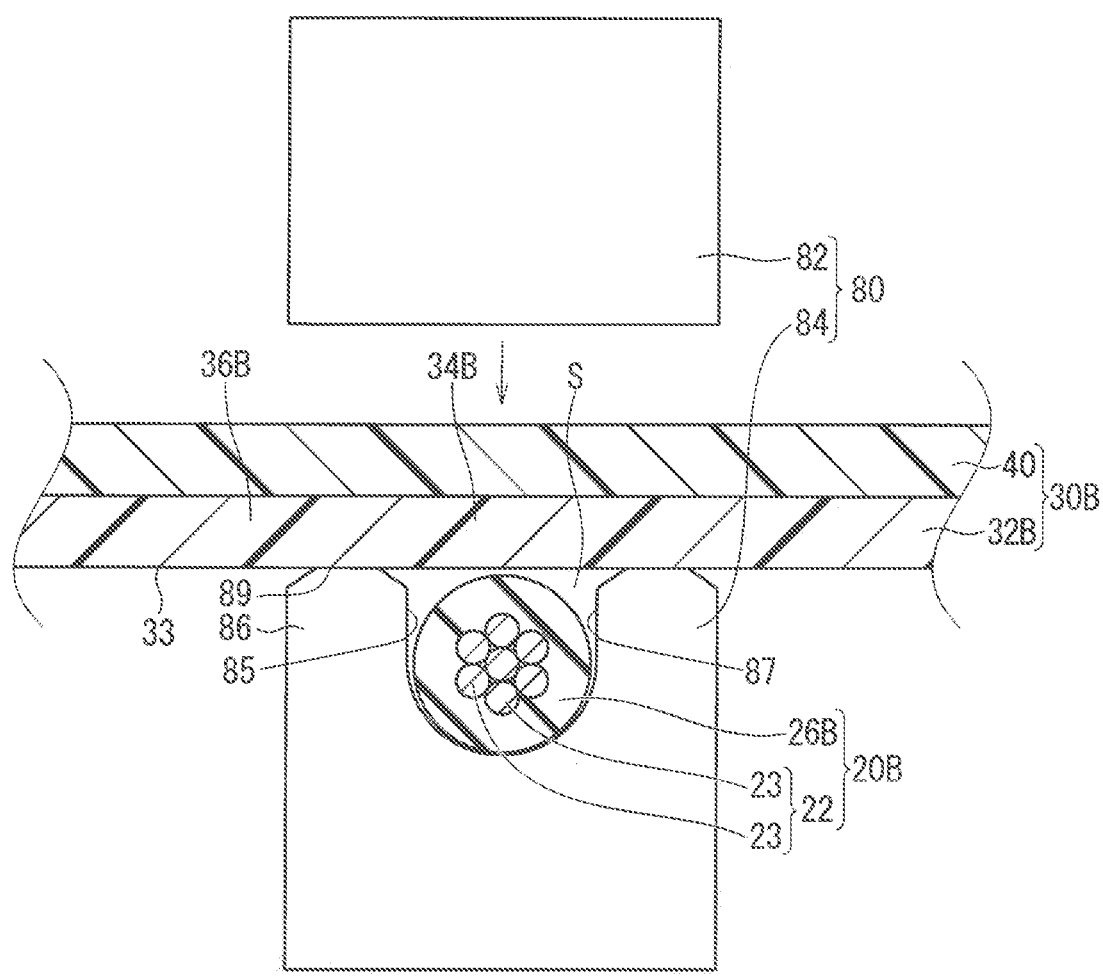
FIG. 3 A diagram for explaining a manufacture of the wire harness according to the embodiment.
Figure 4:
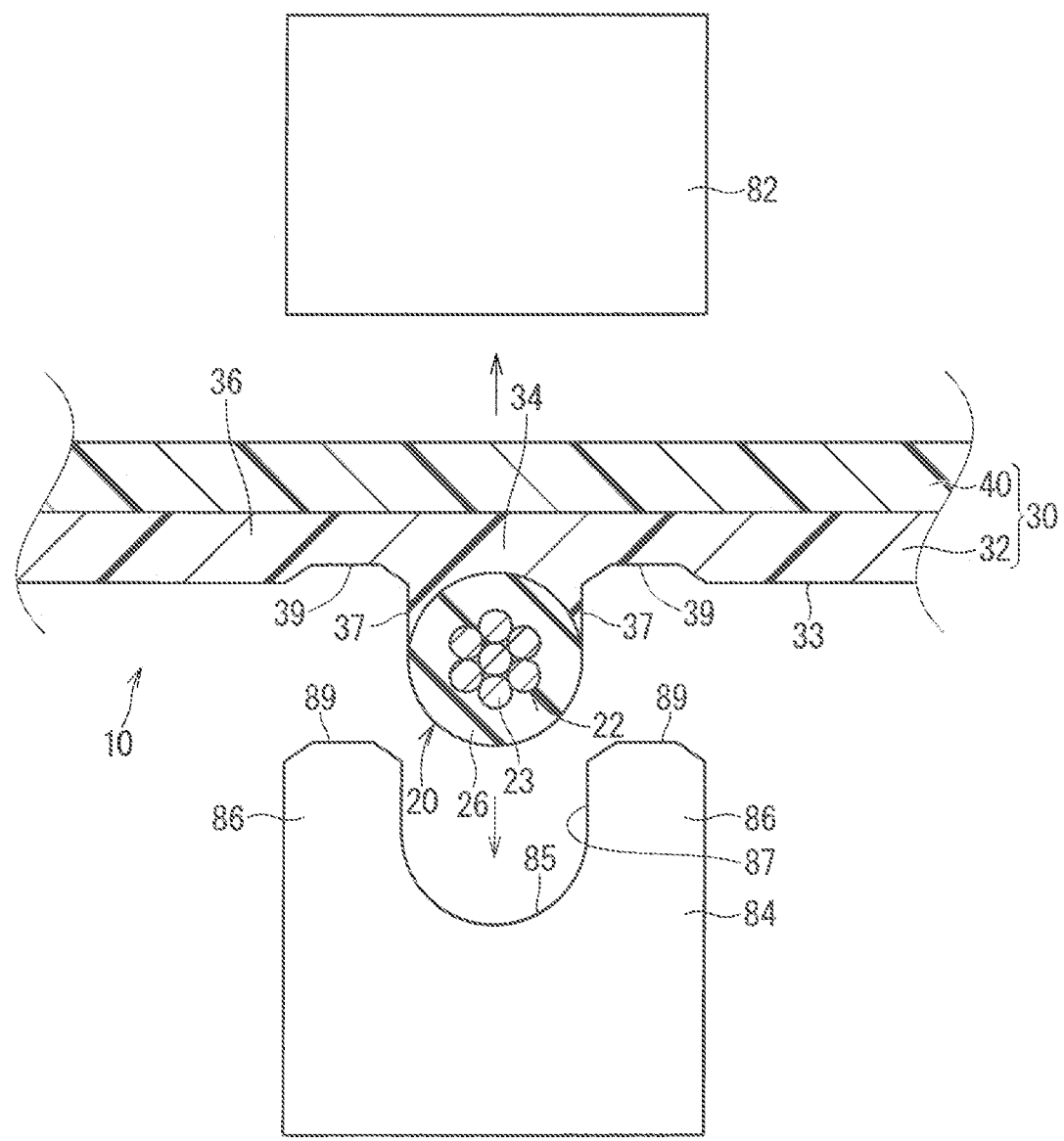
FIG. 4 A diagram for explaining a manufacture of the wire harness according to the embodiment.

Described next is a method of manufacturing a wire harness 10 according to an embodiment. FIG. 3 and FIG. 4 are diagrams for explaining a manufacture of the wire harness 10 according to the embodiment. An electrical wire 20B, for example, in FIG. 3 and FIG. 4 illustrates the electrical wire before welding. That is to say, in the description hereinafter, when the electrical wire, the sheet material, and each element thereof before welding need to be distinguished from those after welding, a reference sign B may be added to the constituent elements before welding in some cases.

Herein, the electrical wire 20B and a sheet material 30B are ultrasonic-welded by an ultrasonic welding machine 80 to manufacture the wire harness 10. The ultrasonic welding machine 80 includes a horn 82 and an anvil 84.

The horn 82 is a member providing a work having contact with the horn 82 of ultrasonic vibration. It is also considered that a convex-concave shape is applied on a surface of the horn 82 having contact with the work as knurled processing, that is to say, for a purpose of slip resistance. The anvil 84 is a member supporting the work with the horn 82 from an opposite side thereof. Accordingly, a pair of parts to be welded in the work are sandwiched between the horn 82 and the anvil 84, thereby being provided with the ultrasonic vibration and welded.

Specifically, in performing the ultrasonic welding, the electrical wire 20B is firstly disposed on an electrical wire disposed part 34B formed softer than the insulating covering 26B in the resin sheet material 30B, and the electrical wire 20B and the electrical wire disposed part 34B are sandwiched by a sandwiching member. For example, as illustrated in FIG. 3, the electrical wire 20B before welding is disposed on a predetermined position on the main surface 33 on a side of the first layer 32 of the sheet material 30B (the electrical wire disposed part 34B), and is supported by the anvil 84. In this state, the horn 82 is brought close to the anvil 84, and the electrical wire 20B and the sheet material 30B are sandwiched by the horn 82 and the anvil 84 so that the insulating covering 261 and the electrical wire disposed part 34B have contact with each other. In this manner, the horn 82 is disposed to press a side of the sheet material 30B and the anvil 84 is disposed to press a side of the electrical wire 20B herein, however, also considered is a case where the horn presses the side of the electrical wire 20B and the anvil presses the side of the sheet material 30B.

A width dimension of the horn 82 is set larger than a diameter of the electrical wire 20B. Accordingly, the horn 82 can have contact with not only the electrical wire disposed part 34B of the sheet material 30B but also the electrical wire un-disposed part 36B on a lateral side of the electrical wire disposed part 34B. The horn $2 sandwiches the electrical wire un-disposed part 36B of the sheet material 30B with the anvil 84.

A holding groove 85 holding the electrical wire 20B is formed in a surface of the anvil 84 facing a side of the horn 82. A pressing part 89 pressing the electrical wire un-disposed part 36B of the sheet material 30 with the horn 82 is formed on a lateral portion of the holding groove 85.

A bottom surface of the holding groove 85 may have a flat surface shape or curved surface shape. In the example illustrated in FIG. 3, the bottom part of the holding groove 85 is formed into the curved surface shape.

The pressing part 89 is located at approximately the same height as that of the electrical wire 20B in a state where the electrical wire 20B is housed in the holding groove 85. The pressing part 89 is preferably located at the same or larger height than that of the electrical wire 20B in the state where the electrical wire 20B is housed in the holding groove 85. In the example illustrated in FIG. 3, the pressing part 89 protrudes slightly higher than the electrical wire 20B in the state where the electrical wire 20B is housed in the holding groove 85.

Herein, a depth dimension of the holding groove 85 is set to be approximately the same as the diameter of the electrical wire 20B (slightly larger than the diameter of the electrical wire 20B in the example in FIG. 3), thus a tip end portion of a wall part 86 constituting the holding groove 85 doubles as the pressing part 89. The pressing part 89 sandwiches a part of the sheet material 30B where the electrical wire 20B is not disposed with the horn 82. The pressing part 89 does not press an end edge portion of the sheet material 30B but presses only a middle portion of the sheet material 30B. Thus, the concave portion 39 is formed in the part of the main surface 33 of the sheet material 30 after welding pressed with the pressing part 89. In the example illustrated in FIG. 3, an edge portion of the pressing part 89 is chamfered, however, there may also be a case where the edge portion thereof is not chamfered. When the edge portion is chamfered, the edge portion is formed into an angled surface shape in the example illustrated in FIG. 3, but may also be informed into a rounded surface shape, for example.

A side closer to an opening part in relation to the bottom part of the holding groove 85 formed into the curved surface shape has a constant width. Thus, an inner surface of the wall part 86 extending from the bottom part of the holding groove 85 to a tip end portion of the pressing part 89 constitutes a vertical surface 87.

Herein, from a viewpoint that the wire harness 10 is disposed in a narrow space in a vehicle, the wire harness 10 preferably has a small thickness. Thus, from this viewpoint, the sheet material 30B preferably has a small thickness. Herein, a thickness dimension of the first layer 32B before welding is set smaller than the diameter of the electrical wire 20B. The thickness dimension of the first layer 32B before welding may be obviously set equal to or larger than the diameter of the electrical wire 20B.

Particularly, herein, the thickness dimension of the first layer 32B before welding is set smaller than a radius of the electrical wire 20B. The thickness dimension of the first layer 32B before welding may be obviously set equal to or larger than the radius of the electrical wire 20B.

Herein, the thickness dimension of the first layer 32B before welding is set larger than a thickness dimension of the insulating covering 26B (herein, an average thickness dimension in view of a fact that the plurality of strands 23 are located). The thickness dimension of the first layer 32B before welding may be obviously set equal to or smaller than the thickness dimension of the insulating covering 26B.

Next, the electrical wire 20B and the electrical wire disposed part 34B are sandwiched by the sandwiching member, and the insulating covering 26B and the electrical wire disposed part 34B are ultrasonic-welded to each other. Herein, the ultrasonic vibration is provided by the horn 82 in a state where the part where the insulating covering 26B and the sheet material 30 have contact with each other is sandwiched between the horn 82 and the anvil 84. Herein, the horn 82 presses the side of the sheet material 30B, thus the ultrasonic vibration is provided from the side of the sheet material 30B. Frictional heat caused by the ultrasonic vibration is generated in the part where the insulating covering 26B and the sheet material 30 have contact with each other, and at least one of them is melted, thus they are joined to each other. Herein, both the insulating covering 26B and the sheet material 30B are formed of materials including PVC as a base, thus they are melted and joined to each other.

At the time of the ultrasonic welding, the electrical wire disposed part 34B becomes softer than the insulating covering 26B. Particularly, herein, both the insulating covering 26B and the electrical wire disposed part 34B are formed of materials including PVC and a plasticizer. At a point of time before the ultrasonic welding is started, the ratio of the plasticizer to PVC constituting the part including the electrical wire disposed part 34B is higher than the ratio of the plasticizer to PVC constituting the insulating covering 26B. This state is also continued at the time of the ultrasonic welding, thus the part including the electrical wire disposed part 34B is softer than the insulating covering 26B at the time of the ultrasonic welding.

At the time of the ultrasonic welding, the electrical wire disposed part 34B is softer than the insulating covering 26B, thus force caused by pressure applied by the horn 82 and the anvil 84 tends to act as force of deforming the electrical wire disposed part 34B in the part where the electrical wire disposed part 34B and the insulating covering 26B have contact with each other. Accordingly, a boundary surface between the electrical wire fixing part 34 and the insulating covering 26B formed by welding the electrical wire disposed part 34B is formed into a shape closer to the circumferential surface which is the original outer peripheral surface of the insulating covering 26 than the shape of the main surface 33 in the electrical wire disposed part 34B before welding.

When there is a part which is not welded along the longitudinal direction of the electrical wire 20, for example, the shape of the circumferential surface which is the original outer peripheral surface of the insulating covering 26 can be confirmed by the part. Herein, also in the part of the electrical wire 20 which is welded along the longitudinal direction, the shape is hardly deformed at the time of welding in a surface on a side opposite to a surface to be welded, thus the shape of the circumferential surface can be also confirmed by this surface.

Furthermore, the pressing part 89 is formed on the anvil 84 and the part of the sheet material 30B is sandwiched between the pressing part 89 and the horn 82, thus a part of the first layer 32B of the sheet material 30B pressed by the pressing part 89 is brought close to a side of the holding groove 85. More specifically, the part of the sheet material 30B pressed by the pressing part 89 is located immediately close to the part where the electrical wire 20B and the sheet material 30B have contact, thus it is considered that frictional heat generated in the part where the electrical wire 20B and the sheet material 30B have contact with each other also reaches the part of the sheet material 30B pressed by the pressing part 89. The part of the sheet material 30B pressed by the pressing part 89 is sandwiched between the horn 82 and the anvil 84, thus it is also considered that the frictional heat is generated directly between that part and the pressing part 89. According to these configurations, the part of the sheet material 30B pressed by the pressing part 89 is softened at the time of the ultrasonic welding and is easily deformed. In the meanwhile, before welding as illustrated in FIG. 3, a gap S is provided on a lateral side of the contact part between the electrical wire 20B and the sheet material 30B. Accordingly, the part of the sheet material 30B pressed by the pressing part 89 is brought to enter the gap S provided between the electrical wire 20B and the sheet material 30B.

Herein, even when the electrical wire disposed part 34B is pressed by the electrical wire 20B, the horn 82, and the anvil 84, the deformation causing the reduction in the thickness in the electrical wire disposed part 34B hardly occurs by reason that the pressing parts 89 are located on the both sides of the electrical wire disposed part 34B.

The sheet material 30B is pressed by the pressing part 89 in this manner, thus a volume of the electrical wire fixing part 34 is easily increased. Particularly herein, the pressing parts 89 are formed on the both sides of the holding groove 85, thus the volume of the electrical wire fixing part 34 is easily increased on both sides of a center line through a center of the electrical wire 20. As a result, the sheet material 30 is welded in the large area in the circumferential direction of the electrical wire 20 while reduction in the dimension A is suppressed. Particularly, the gap S provided on the lateral side of the part where the electrical wire 20B and the sheet material 30B have contact with each other therebetween before welding is filled with a deformation part 35 of the sheet material 30.

At this time, the pressing part 89 is formed smaller in width than the electrical wire un-disposed part 36B of the sheet material 30B, thus the part of the sheet material 30B pressed by the pressing part 89 is concaved compared with a surrounding thereof. This concave portion is hot-pressed through the ultrasonic welding process, thus a mark of pressing in the sheet material 30 remains as the concave portion 39 corresponding to the shape of the pressing part 89.

<Effect Etc.>

According to the wire harness 10 having the above configuration, the dimension B is larger than each of the dimensions C and D, thus the thickness necessary for the electrical wire fixing part 34 can be obtained while using the sheet material 30 having the small thickness in whole, and increase in quantity of the wire harness 10 can be suppressed. Particularly, the electrical wire un-disposed part 36B of the sheet material 30B is brought close to the electrical wire disposed part 34B at the time of the ultrasonic welding, thus the volume of the electrical wire fixing part 34 can be increased. Accordingly, the thickness necessary for the electrical wire fixing part 34 can be obtained while using the sheet material 30 having the small thickness in whole, and the increase in quantity of the wire harness 10 can be suppressed. At this time, the part of the concave portion 39 concaved in the lateral portion of the electrical wire 20 in the sheet material 30 is brought close to the electrical wire fixing part 34, thus the volume of the electrical wire fixing part 34 can be significantly increased.

In the ultrasonic welding, pressure is applied to the part where the sheet material 30B and the electrical wire 20B are to be welded, and the ultrasonic vibration is provided to weld the part. At this time, according to the wire harness 10 described above, the deformation due to the pressure described above occurs more easily in the electrical wire fixing part 34 of the sheet material 30 softer than the insulating covering 26. Furthermore, energy according to the ultrasonic vibration is easily absorbed by the soft electrical wire fixing part 34 of the sheet material 30, and is hardly transmitted to the insulating covering 26. Accordingly, the insulating covering 26 of the electrical wire 20 can be welded with as little deformation as possible compared with a case where the electrical wire fixing part 34 of the sheet material 30 is harder than the insulating covering 26. At this time, even when a so-called round wire is used the insulating covering 26 of the electrical wire 20 can be welded with as little deformation as possible.

Particularly herein, the wire harness 10 described above is manufactured in the condition where the electrical wire disposed part 34B is softer than the insulating covering 26B under a temperature heated by the frictional heat at a point of time of the ultrasonic welding and pressure.

Herein, the softness of the sheet material 30 and the insulating covering 26 is adjusted using the plasticizer. It is known that a plasticizer is transferred to a member having contact with the plasticizer as time proceeds, for example, in some cases. Thus, after the ultrasonic welding, the plasticizer may be transferred between the electrical wire fixing part 34 and the insulating covering 26 in some cases. In this case, it is also considered that the plasticizer of the electrical wire fixing part 34 and the plasticizer of the insulating covering 26 reach equilibrium and the electrical wire fixing part 34 and the insulating covering 26 have the same hardness. There may also be the other case where the hardness of the electrical wire fixing part 34 is equal to or larger than that of the insulating covering 26 by processing after the ultrasonic welding (for example, only the electrical wire fixing part 34 is hot-pressed in the electrical wire 20 and the electrical wire fixing part 34). Even in such a case, the boundary surface between the electrical wire fixing part 34 and the insulating covering 26 is considered to keep the shape following the outer peripheral surface of the insulating covering 26.

The ratio of the plasticizer is adjusted, thus even when the electrical wire 20 having the general insulating covering 26 made of PVC is used as an automobile electrical wire, the electrical wire fixing part 34 can be formed softer than the insulating covering 26.

The sheet material 30 includes the first layer 32 as the electrical wire fixing layer 32 and the second layer 40 stacked on the first layer 32, thus a quality desired for the sheet material 30 can be provided by the second layer 40 while the first layer 32 has physical properties appropriate for the fixation of the electrical wire 20.

[First Modification Example]

Figure 5:
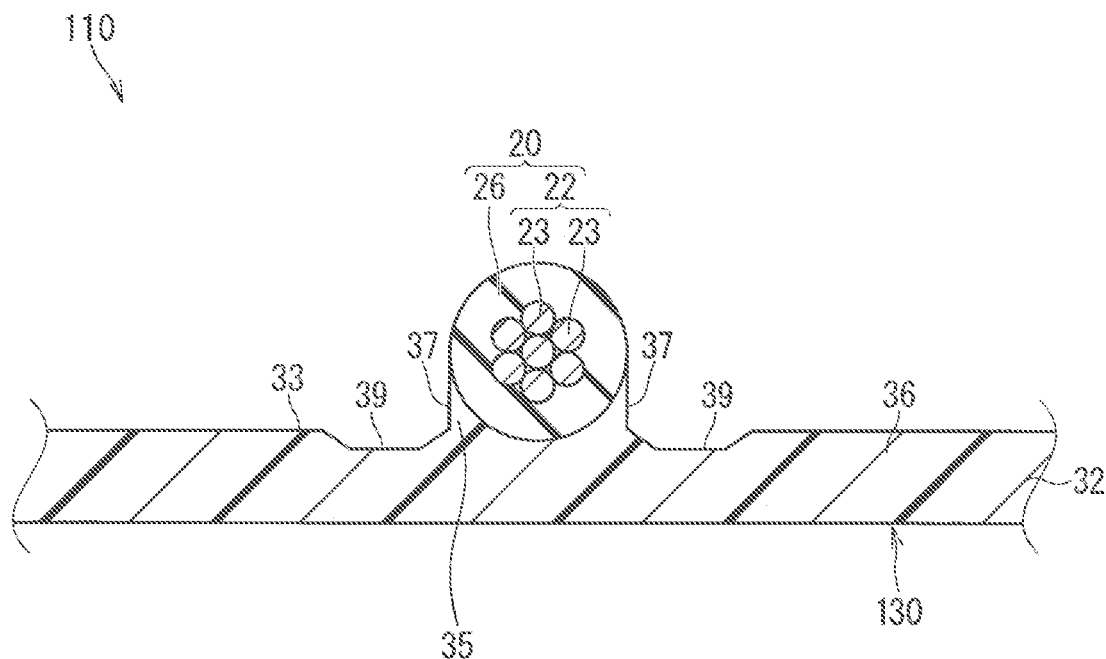
FIG. 5 A cross-sectional view illustrating a wire harness according to a first modification example.

FIG. 5 is a cross-sectional view illustrating a wire harness 110 according to a first modification example.

In the description of the present embodiment, the sheet material 30 has a double-layered structure, however, this configuration is not necessary. There may also be a case where a sheet material 130 is made up of a single layer of the electrical wire fixing layer 32 as is the case in the wire harness 110 according to the first modification example.

When such a sheet material 130 is adopted, the sheet material 130 used for welding can be easily manufactured.

[Second Modification Example]

Figure 6:
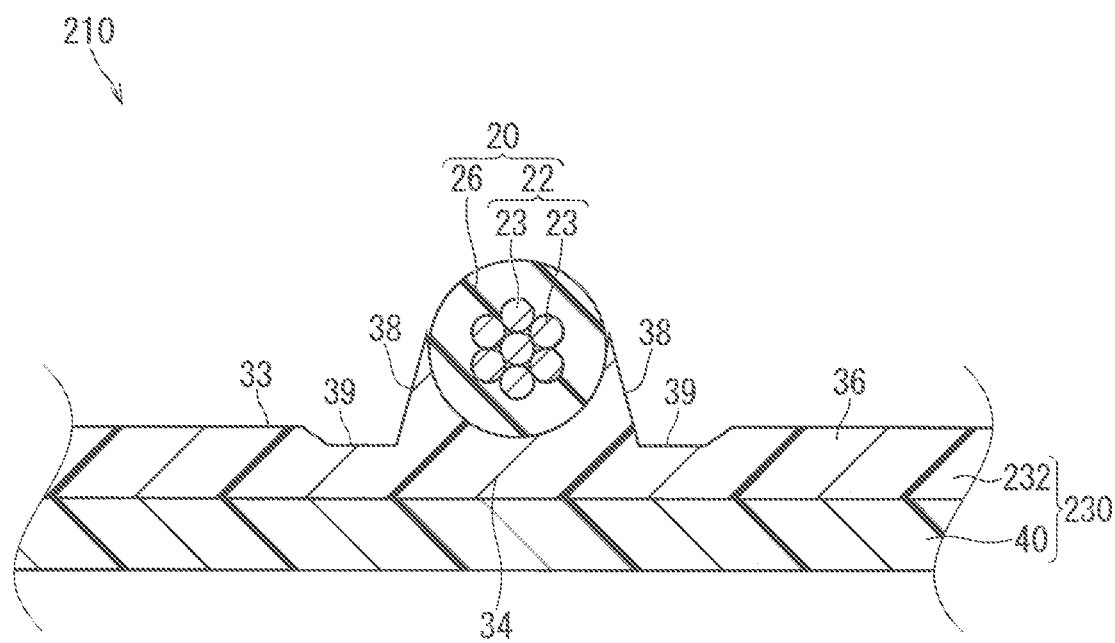
FIG. 6 A cross-sectional view illustrating a wire harness according to a second modification example.
Figure 7:
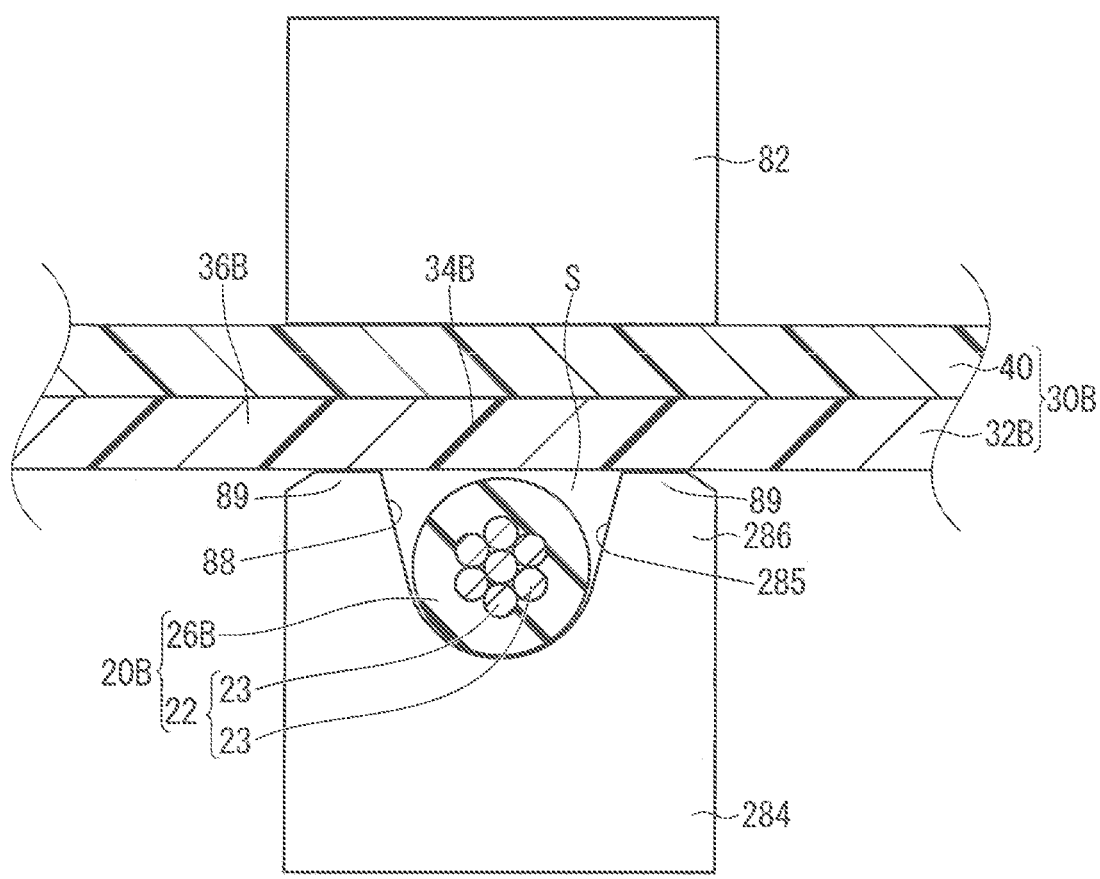
FIG. 7 A diagram for explaining a manufacture of the wire harness according to the second modification example.

FIG. 6 is a cross-sectional view illustrating a wire harness 210 according to a second modification example. FIG. 7 is a drawing for explaining a manufacture of a wire harness 210 according to the second modification example.

In the description of the embodiment, the vertical surface 37 extends from the end portion of the boundary surface of welding toward the electrical wire un-disposed part 36 of the sheet material 30, however, this configuration is not necessary. It is also considered that an inclined surface 38 extends from the end portion of the boundary surface of welding toward the electrical wire un-disposed part 36 as is a case in the wire harness 210 according to the second modification example. The inclined surface 38 is formed in the lateral portion of the electrical wire 20 in the main surface 33 of a sheet material 230 so that a height along the thickness direction decreases with increase in distance from the electrical wire 20.

For example, as illustrated in FIG. 7, formed is an inclined surface 88 in which a width of a surface extending from a bottom part to an opening in an inner surface of the holding groove 285 (an inner surface of a wall part 286) formed in an anvil 284 gradually increases, thus the inclined surface 38 described above in the sheet material 230 can be formed in conjunction therewith at the time of the ultrasonic welding. At this time, the inclined surface 88 is formed in the anvil 284, thus the part of the electrical wire un-disposed part 36B in the sheet material 30B pressed by the pressing part 89 is easily brought close to the electrical wire disposed part 34B. Accordingly, when the inclined surface 38 is formed in the lateral portion of the electrical wire 20 in the main surface 33 of the sheet material 230 so that the height along the thickness direction decreases with increase in distance from the electrical wire 20, the lateral portion of the electrical wire 20 in the sheet material 230 is easily brought close to the electrical wire fixing part 34.

[Other Modification Example]

In the above description, the electrical wire fixing part 34 is softer than the insulating covering 26 in the wire harness 10, however, this configuration is not necessary. There may also be a case where the electrical wire fixing part 34 has the same hardness as the insulating covering 26 or is harder than the insulating covering 26. In the similar manner, in the above description, the electrical wire fixing part 34B is softer than the insulating covering 26B, however, this configuration is not necessary. There may also be a case where the electrical wire fixing part 34B has the same hardness as the insulating covering 26B or is harder than the insulating covering 26B at the time of the ultrasonic welding. Even in these cases, the dimension B can be made larger than each of the dimensions C and D by changing the thickness of the sheet material before welding or performing the ultrasonic welding using the anvil 84 having the pressing part 89.

In the above description, the concave portion 39 is formed in the lateral portion of the electrical wire 20 in the main surface 33 of the sheet material 30, however, this configuration is not necessary. There may also be a case where the concave portion 39 is not formed in the lateral portion of the electrical wire 20 in the main surface 33 of the sheet material 30. For example, it is considered that the concave portion 39 is not formed when the pressing part 89 of the anvil 84 presses the whole electrical wire un-disposed part 36B in the sheet material 30 or when the pressing part 89 is not provided in the anvil and the anvil does not have contact with the electrical wire un-disposed part 36B in the sheet material 30, for example.

In the above description, the lateral portion of the electrical wire 20 in the sheet material 30 is formed into the shape of the sequential vertical surface 37 or inclined surface 38, however, this configuration is not necessary. It is also considered that the lateral portion of the electrical wire 20 in the sheet material 30 is formed to have a difference in level. For example, it is considered that an inner surface of the wall part 86 extending from the bottom part of the holding groove 85 to the tip end portion of the pressing part 89 is formed to have a difference in level in the anvil, thus the lateral portion of the electrical wire 20 in the sheet material 30 is formed to have a difference in level.

In the above description, the electrical wire 20 is a round wire, however, this configuration is not necessary. There may also be a case where an electrical wire such as an angular wire, for example, other than the round wire is adopted as the electrical wire 20.

In the above description, the insulating covering 26 and the electrical wire fixing layer 32 are formed of a material including PVC as a base, however, this configuration is not necessary. For example, there may also be a case where the insulating covering 26 and the electrical wire fixing layer 32 are formed of a material including PE or PP as a base. In this case, a density of PE or PP which is to be a base of the electrical wire fixing layer 32 is made lower than that of PE or PP which is to be a base of the insulating covering 26, or PE or PP which is to be a base of the electrical wire fixing layer 32 is reacted with isobutylene, for example, thus the electrical wire fixing layer 32 can be made softer than the insulating covering 26.

In the above description, in the insulating covering 26 and the electrical wire fixing layer 32 formed of a material including PVC as a base, the electrical wire fixing layer 32 is made softer than the insulating covering 26 by changing the ratio of the plasticizer, however, this configuration is not necessary. For example, it is also considered that the electrical wire fixing layer 32 is made softer than the insulating covering 26 by changing a polymerization degree (molecular weight) of PVC. In this case, the polymerization degree of PVC constituting the electrical wire fixing layer 32 is made lower than that of PVC constituting the insulating covering 26, thus the electrical wire fixing layer 32 can be made softer than the insulating covering 26. In this case, both changing the ratio of the plasticizer and changing the polymerization degree can be achieved together. Accordingly, when the electrical wire fixing layer 32 is made softer than the insulating covering 26 in the insulating covering 26 and the electrical wire fixing layer 32 formed of a material including PVC as a base, both the ratio of the plasticizer and the polymerization degree may be changed, only the ratio of the plasticizer may be changed, or only the polymerization degree may be changed.

In the above description, the second layer 40 is made up of a resin material to be formed harder than the first layer 32 for a purpose of improving shape retainability or abrasion resistance properties, for example, however, this configuration is not necessary. For example, metal foil such as aluminum foil is adopted as the second layer 40, thus it is considered that the sheet material 30 is configured to have shielding properties and increase heat radiation properties.

In the above description, the sheet material has the single-layered or double-layered structure, however, the sheet material 30 is also considered to have a configuration of three or more layers. That is to say, a third layer and a fourth layer are sequentially stacked on the second layer on a side opposite to the first layer. When the sheet material has a three-layered structure, it is considered that the second layer is a layer formed of a material of PP or PET in which a plasticizer is hardly transferred, and the third layer is a layer formed of PVC and harder than the first layer 32 (a layer corresponding to the second layer 40 in the above embodiment). According to such a formation, the second layer functions as a barrier layer suppressing the transfer of the plasticizer from the first layer to the third layer.

In the above description, the insulating covering 26 and the electrical wire fixing layer 32 are ultrasonic-welded, however, this configuration is not necessary. The insulating covering 26 and the electrical wire fixing layer 32 may be welded by a welding means such as hot-air welding or high-frequency welding other than the ultrasonic welding.

When the resin as the base of the insulating covering 26 and the electrical wire fixing layer 32 is PVC, the additive agent added other than the plasticizer needs to be added without interfering with a hardness determined by an amount of the plasticizer. It is also applicable to add as the additive agent, for example, a thermal stabilizer, an inorganic filler (for example, calcium carbonate, talc, silica, clay), or a rubber material (for example, chlorinated polyethylene (CPE), methyl methacrylate-butadiene-styrene copolymer resin (MBS), polyurethane elastomer, ethylene-vinyl acetate copolymer resin (EVA)).

Each configuration described in the embodiment and each modification example can be appropriately combined as long as they are not contradictory.

Although the present invention is described in detail, the foregoing description is in all aspects illustrative and does not restrict the invention. It is therefore understood that numerous modifications and variations can be devised without departing from the scope of the invention.

EXPLANATION OF REFERENCE SIGNS 10 wire harness
20 electrical wire
22 core wire
23 strand
26 insulating covering
30 sheet material
32 first layer (electrical wire fixing layer)
33 main surface
34 electrical wire fixing part
34B electrical wire disposed part
35 deformation part
36 electrical wire un-disposed part
37 vertical surface
38 inclined surface
39 concave portion
40 second layer
80 ultrasonic welding machine
82 horn
84 anvil
85 holding groove
89 pressing part

The invention claimed is:

1. A wire harness, comprising:
   an electrical wire including a core wire and an insulating covering for covering the core wire; and
   a resin sheet material in which the electrical wire is disposed on a main surface, and a part of the main surface having contact with the electrical wire is welded to the insulating covering of the electrical wire, thereby forming an electrical wire fixing part, wherein
   a largest thickness dimension in the electrical wire fixing part in the sheet material is formed larger than a thickness dimension in a part of the sheet material where the electrical wire is not disposed, and
   the core wire and the sheet material are insulated in the electrical wire fixing part.

2. A wire harness comprising:

an electrical wire including a core wire and an insulating covering for covering the core wire; and a resin sheet material in which the electrical wire is disposed on a main surface, and a part of the main surface having contact with the electrical wire is welded to the insulating covering of the electrical wire, thereby forming an electrical wire fixing part, wherein a largest thickness dimension in the electrical wire fixing part in the sheet material is formed larger than a thickness dimension in a part of the sheet material where the electrical wire is not disposed, and a lateral portion of the electrical wire is concave in the main surface of the sheet material.

3. The wire harness according to claim 1, wherein an inclined surface is formed in the lateral portion of the electrical wire in the main surface of the sheet material so that a height along a thickness direction decreases with increase in distance from the electrical wire.

4. A method of manufacturing a wire harness, comprising steps of:

(a) locating an electrical wire including a core wire and an insulating covering for covering the core wire on a resin electrical wire disposed part in a sheet material, and sandwiching the electrical wire and the electrical wire disposed part by a sandwiching member; and (b) after the step of (a), bringing a part of the sheet material where the electrical wire is not disposed close to the electrical wire disposed part, and welding the insulating covering and the electrical wire disposed part so that the core wire and the sheet material are insulated.

\* \* \* \* \*